United States Patent [19]

Hinnergardt

[11] 3,914,446

[45] Oct. 21, 1975

[54] METHOD OF PRODUCING FREEZE-DRIED BACON SLICES

[75] Inventor: Larry C. Hinnergardt, Franklin, Mass.

[73] Assignee: The United States of America as represented by the Secretary of the Army, Washington, D.C.

[22] Filed: Aug. 21, 1974

[21] Appl. No.: 499,247

[52] U.S. Cl. ............................. 426/385; 426/645
[51] Int. Cl.² ........................................ A23L 1/31
[58] Field of Search ........... 426/149, 242, 384, 385, 426/645; 34/5

[56] References Cited
UNITED STATES PATENTS 2,765,236   10/1956   Blaine, Jr. ............................ 426/385
3,497,363   2/1970   Fox ..................................... 426/385

OTHER PUBLICATIONS

Cotson et al., "Freeze–Drying of Foodstuffs," 1963, Published by Columbine Press, London, pp. 122 to 128, inclusive.

Primary Examiner—Hyman Lord
Attorney, Agent, or Firm—Nathan Edelberg; Robert P. Gibson; Charles C. Rainey

[57] ABSTRACT

Bacon is freeze-dried in the raw state to a moisture content of not more than 5 percent and packaged in gas-tight containers for storage purposes. The freeze-dried raw bacon may be cooked prior to packaging in gas-tight containers. It does not spatter during the cooking thereof and the cooked freeze-dried bacon has good storage stability.

2 Claims, No Drawings

METHOD OF PRODUCING FREEZE-DRIED BACON SLICES

The invention described herein may be manufactured, used, and licensed by or for the Government for governmental purposes without the payment to me of any royalty thereon.

BACKGROUND OF THE INVENTION

This invention relates to freeze-dried bacon in the raw state or cooked and ready to be eaten when removed from the gas-tight container in which it is vacuum-packaged for storage purposes.

Bacon is a highly desirable component of breakfast meals and is frequently used as a component of sandwiches or in combination with eggs, pancakes and other non-meat food items in the preparation of menus for other meals. The Armed Forces also use bacon as a component of rations both for field use and for mess hall meals. It is particulary important to the Armed Forces that any food item possess good storage stability so that even after many months of storage, the food will be acceptable. Since foods sometimes must be stored in warehouses or at other sites at temperatures of as high as 100°F. or even higher over prolonged periods of time, it is very important that most foods be capable of being stored for long periods of time at such temperatures and still exhibit characteristics as close as possible to the characteristics of the food as originally produced. Naturally it would be too much to expect that there would be no losses in the well-known characteristics of foods which are generally well-liked. But if the rate of change from the original characteristics can be kept to a very low value, much can be accomplished in terms of providing acceptable foods months or even years after processing of the foods, including sterilization and packaging thereof.

Bacon is a food product which is very susceptible to oxidation and rancidification, particularly at higher storage temperatures and especially in the presence of oxygen under present curing techniques. For the civilian market, where refrigeration is readily available and the turnover is rapid, there is no serious problem associated with the maintenance of good acceptability in bacon. But for the Armed Forces there has been a rather serious problem in preparing bacon so that it may be stored for long periods of time without becoming unacceptable. An attempt has been made to solve this problem by prefrying bacon slices and packaging the prefried bacon slices under vacuum either in hermetically sealed metal cans or in hermetically sealed, gas-tight, flexible plastic pouches. However, prefried bacon slices require a relatively high concentration of sodium chloride therein for preservation thereof through storage at temperatures above 40°F.

An object of the invention is to provide a bacon product of increased storage stability while having lower sodium chloride content than prefried bacon slices.

Another object is to provide a bacon product which does not spatter the melted fat rendered therefrom during heating thereof.

Other objects and advantages will be apparent from the following description of the invention, and the novel features will be particularly pointed out hereinafter in conncection with the appended claims.

SUMMARY OF THE INVENTION

The objects of the invention are accomplished by freeze-vacuum-dehydrating raw bacon to less than about 5.0 percent moisture content. The resulting freeze-dried bacon may be packaged in the raw or cooked state under vacuum in a hermetically sealed container which is substantially gas-tight, such as a hermetically sealed metal can or a hermetically sealed laminated polymeric film and foil pouch which is substantially impervious to air and other gases.

DESCRIPTION OF THE PREFERRED EMBODIMENT

One aspect of this invention relates to my discovery that bacon may be prevented from spattering during heating thereof by the removal of a substantial portion of the moisture content of the bacon therefrom, preferably by freeze-vacuum-dehydration of the raw bacon. I have found it to be desirable to reduce the moisture content of the bacon to not more than about 5.0 percent by weight. When this has been done, the resulting freeze-dried raw bacon is practically spatterless when it is fried or oven-baked during cooking thereof.

However, a more important aspect of the invention is the enhanced storage stability of bacon which has been freeze-dried to a moisture content of not more than about 5.0 percent. This is shown by the high degree of acceptability of cooked bacon prepared from the freeze-dried raw bacon hermetically sealed under vacuum in a gas-tight and moisture impermeable container for prolonged storage periods at room temperature or even higher temperatures and cooked after removal from such a container.

The example below will serve to illustrate the invention and show the effectivenss of the freeze-vacuum-dehydration of bacon on the storage stability and acceptability of bacon. It is to be understood throughout the specification and claims that percentages are in terms of weight, unless otherwise indicated.

EXAMPLE

Shingled slabs of raw sugar cured bacon slices were frozen at a temperature of about −10°F., then freeze-vacuum-dehydrated in a conventional manner in a commercial freeze dryer at a pressure of about 0.3 mm of mercury using a platen heated to about 125°F. until the moisture content of the bacon was reduced to about 0.73 percent. The freeze-dried raw bacon was vacuum packed at a pressure of 28 inches of mercury in metal cans which were hermetically sealed to exclude air. Cans of the freeze-dried raw bacon were stored at various temperatures of 40°F., 70°F., and 100°F. for 6 months. The freeze-dried raw bacon was removed from the cans and grilled at about 350°F. for about 1½ minutes on each side prior to testing of the bacon in terms of flavor, odor, and appearnace (overall). It did not spatter grease and the slices of bacon did not curl appreciably while being grilled as usually happens with fresh bacon. Table 1 gives the results of technological panel testing of the grilled freeze-dried bacon initially, i.e. within 24 hours after freeze drying, and after storage for 6 months at the three temperature of 40°F., 70°F., and 100°F. Eighteen trained food technologists were on the panel. Each value shown represents an average of the eighteen ratings of the panel on the "Hedonic Scale," which involves the assignment of ratings from 1 to 9, a rating of 5 representing the borderline of acceptability while the higher the rating, the more acceptable, and the lower the rating, the less acceptable the product is with respect to the characteristic being rated, insofar as the technological panel members are concerned.

Table 1

|  | Flavor | Odor | Appearance |
|---|---|---|---|
| Initial | 7.3 | 6.9 | 6.5 |
| 6 Months at 40°F. | 6.8 | 6.8 | 6.5 |
| 6 Months at 70°F. | 6.8 | 7.0 | 6.6 |
| 6 Months at 100°F. | 6.9 | 7.1 | 7.1 |

It is apparent from the above results that freeze-dried raw bacon was quite storage-stable for at least six months at storage temperatures as high as 100°F. when packaged under vacuum in hermetically sealed gas-tight containers. The above results compare favorably with oven-baked fresh bacon cooked at about 350°F. for about 30 minutes to attain about the same degree of crispness, the latter cooked bacon being rated an average of 7.6 for flavor, 7.6 for odor and 7.2 for appearance as rated by a comparable technological panel.

Raw bacon can be readily freeze dried to a moisture content of less than 1.0 percent. In fact, I have freeze dried raw bacon to as low as about 0.7 percent moisture. In general, the lower the moisture content of the freeze-dried raw bacon, the better its storage stability. I prefer that it be freeze dried to not more than 2.0 percent moisture.

In addition to the above-described advantages of freeze-dried raw bacon of being highly storage stable and of not spattering grease when being cooked, slices thereof separate more easily than slices of fresh raw bacon. Furthermore, it does not feel as greasy or oily as fresh raw bacon or prefried bacon and it does not require as high a concentration of sodium chloride as prefried bacon for preservation purposes.

If desired, the freeze-dried raw bacon may be fried or oven-baked prior to packaging thereof for storage purposes. If packaged under vacuum in hermetically sealed containers which are gas-tight, the freeze-dried cooked bacon remains acceptable for considerable periods of storage time, particularly if it has been freeze dried to not more than 1.0 percent moisture and if it is packaged in gas-tight containers and stored at temperatures of 70°F. or lower. The freeze-dried cooked bacon has the advantage that it is ready to be eaten as soon as the package is opened and it constitutes a good replacement for sliced prefried bacon prepared from fresh bacon. It appears less greasy than fried fresh bacon or sliced prefried bacon before or after packaging and storing thereof.

I wish it to be understood that I do not desire to be limited to the exact details described, for obvious modifications will occur to a person skilled in the art.

I claim:

1. A method of producing freeze-dried bacon slices characterized by freedom from spattering when being heated which comprises the steps of freezing raw bacon slices at about −10°F. and then freeze-Vacuum dehydrating the frozen raw bacon slices to a moisture content of not more than 5 percent while maintaining the platen temperature employed in said freeze-vacuum dehydrating step at about 125°F. and maintaining the pressure employed in said freeze-vacuum dehydrating step at about 0.3 mm. of mercury.

2. The method of claim 1 wherein the raw bacon slices are freeze-dried to a moisture content of not more than 2 percent.

* * * * *